(12) United States Patent
Poulsen (10) Patent No.: US 11,756,054 B1
(45) Date of Patent: Sep. 12, 2023

(54) ITEM AUTHENTICATION SYSTEMS AND METHODS

(71) Applicant: Peter D. Poulsen, Grants Pass, OR (US)

(72) Inventor: Peter D. Poulsen, Grants Pass, OR (US)

(*) Notice: Subject to any disclaimer, the term of this patent is extended or adjusted under 35 U.S.C. 154(b) by 0 days.

(21) Appl. No.: 18/106,320

(22) Filed: Feb. 6, 2023

Related U.S. Application Data (60) Provisional application No. 63/405,488, filed on Sep. 12, 2022.

(51) Int. Cl.
*G06Q 30/018* (2023.01)
*G06F 16/906* (2019.01)
*G06Q 50/26* (2012.01)

(52) U.S. Cl.
CPC ....... *G06Q 30/0185* (2013.01); *G06F 16/906* (2019.01); *G06Q 50/26* (2013.01)

(58) Field of Classification Search
CPC ... G06Q 30/0185; G06Q 50/26; G06F 16/906
USPC ......................................................... 707/758
See application file for complete search history.

(56) References Cited

U.S. PATENT DOCUMENTS

| | | | | |
|---|---|---|---|---|
| 10,957,178 | B2* | 3/2021 | Beyer | H04W 4/023 |
| 2006/0072787 | A1* | 4/2006 | Claudatos | G06Q 20/203 |
| | | | | 382/103 |
| 2006/0074759 | A1* | 4/2006 | Claudatos | G06Q 20/367 |
| | | | | 705/65 |
| 2007/0103294 | A1* | 5/2007 | Bonecutter | G08B 25/10 |
| | | | | 340/539.18 |
| 2008/0126417 | A1* | 5/2008 | Mazurik | G06F 16/80 |
| 2009/0284348 | A1* | 11/2009 | Pfeffer | G08B 25/006 |
| | | | | 340/7.3 |
| 2015/0092928 | A1* | 4/2015 | Jensen | G16H 50/70 |
| | | | | 379/45 |
| 2015/0288819 | A1* | 10/2015 | Brown | G08B 25/00 |
| | | | | 379/45 |
| 2020/0286353 | A1* | 9/2020 | Jafri | G08B 21/02 |

FOREIGN PATENT DOCUMENTS

| | | | | |
|---|---|---|---|---|
| WO | WO 2011/124073 A1 * | 10/2011 | | H04L 12/24 |
| WO | WO 2017/031544 A1 * | 3/2017 | | G06Q 50/28 |
| WO | WO 2022/171713 A1 * | 8/2022 | | H04W 4/021 |

* cited by examiner

*Primary Examiner* — Robert Stevens
(74) *Attorney, Agent, or Firm* — David S. Alavi (57) ABSTRACT

Items with first indicia of corresponding unique identifiers are worn or carried by duty personnel. One of those items worn or carried by personnel involved in an exceptional, significant, or noteworthy incident is retrieved and authenticated, and information or content pertaining to the incident is stored in a database associated with the corresponding unique identifier of the item. Upon being scanned or machine-read the first indicia can activate a software link to the information or content pertaining to the incident. The first indicia, subsequently added second indicia, or additional identification data can be employed for subsequent authentication of the item.

43 Claims, 4 Drawing Sheets

ITEM AUTHENTICATION SYSTEMS AND METHODS

BENEFIT CLAIMS TO RELATED APPLICATIONS

This application claims benefit of U.S. provisional App. No. 63/405,488 entitled "Authenticated subscription service" filed Sep. 12, 2022 in the name of Peter D. Poulsen (hereinafter referred to as the '488 priority application); said provisional application is hereby incorporated by reference as if set forth herein in its entirety.

FIELD OF THE INVENTION

The field of the present invention relates to authentication of specific items, including items involved in specific incidents.

SUMMARY

An inventive computer-implemented method, performed by a provider of a subscription service, includes (a) providing or receiving a unique identifier for each of a plurality of items, (b) receiving data or imagery of first indicia of the unique identifiers on the items, (c) generating, retrieving, or receiving corresponding information or content pertaining to one or more incidents, and (d) for each incident, storing the corresponding information or content in association with the corresponding unique identifier. The items are of a selected type or category. The received data or imagery show or are indicative of the corresponding first indicia integrated into each item or affixed or applied to each item. Each incident is of a corresponding type among a set of defined incident types. Each incident, which occurs after the data or imagery of the first indicia have been received, involves corresponding members of a selected group of duty personnel while wearing or carrying corresponding items. For each incident, the corresponding pertinent information or content is generated, retrieved, or received after the incident occurs, and is then stored in a network-accessible database in association with the corresponding unique identifier of the corresponding item. For each incident is stored a software or network link to the corresponding information or content stored in the database. The link is activated by using a network-connected device to scan or machine-read the first indicia of the corresponding unique identifier or second indicia of the corresponding unique identifier subsequently integrated with, affixed to, or applied to the corresponding item.

Another inventive method, performed by a subscriber to the subscription service, includes (a) providing to the subscription service, or receiving from the subscription service, the corresponding unique identifier for each of the items, (b) for each item, integrating into or affixing or applying to that item the first indicia of its corresponding unique identifier, (c) transmitting to the subscription service the data or imagery of the first indicia of the unique identifiers on the items, (d) distributing the items with the first indicia among members of a selected group of duty personnel, to be worn or carried by those duty personnel while performing duties, (e) for each of the one or more incidents, retrieving from the duty personnel item(s) worn or carried by duty personnel involved in that incident, and (f) transmitting to the subscription service information or content pertaining to each incident.

Objects and advantages pertaining to authentication of items may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION

The following detailed description should be read with reference to the drawings, in which identical reference numbers refer to like elements throughout the different figures. The drawings, which are not necessarily to scale, depict selective examples and are not intended to limit the scope of the invention. The detailed description illustrates by way of example, not by way of limitation, the principles of the invention.

A subscription service can establish and maintain authentication of items involved in certain defined incident types that might be deemed exceptional, significant, or noteworthy by the subscription service (referred to hereinafter as ESN incidents). Such ESN incident types often can involve duty personnel such as, e.g., police officers or other law enforcement personnel, firefighters, emergency medical first responders, medical or veterinary personnel, military personnel (Army, Navy, Marines, Air Force, Space Force, National Guard, or Coast Guard), or park rangers or other park or forest service personnel. Other groups of duty personnel can be included. Examples of types of potentially exceptional, significant, or noteworthy incidents can include, e.g., fire rescues (e.g., structure fire or wildfire), entrapped rescues (e.g., from wreckage of a traffic accident or structural collapse, from a flood, landslide, or avalanche, from a hole, cave, mine, or cave-in), searches-and-rescues (on land or on water), hostage rescues, thwarted crimes, medical procedures (e.g., emergency or high-risk births, pioneering or experimental procedures, life-saving procedures, organ transplants, ER or EMT medical procedures), military operations, or animal rescues. Other types of incidents can be included. In some examples an ESN incident can be single, isolated incident (e.g., a specific rescue, a specific birth or surgery, a specific military operation); in some examples the ESN incident can be a cumulative achievement (e.g., 100th flight mission, 1000th patient treated, 10th successful CPR revival, and so on).

Potential subscribers to the subscription service can include one or more of, e.g., police or fire departments; military units; hospital administrators; federal, state, or local government agencies, departments, or entities; associations of current or former police officers or firefighters; associations of current or former military personnel; associations of doctors, nurses, EMTs, or other medical personnel. Other groups or organizations could subscribe as well.

Figure 1:
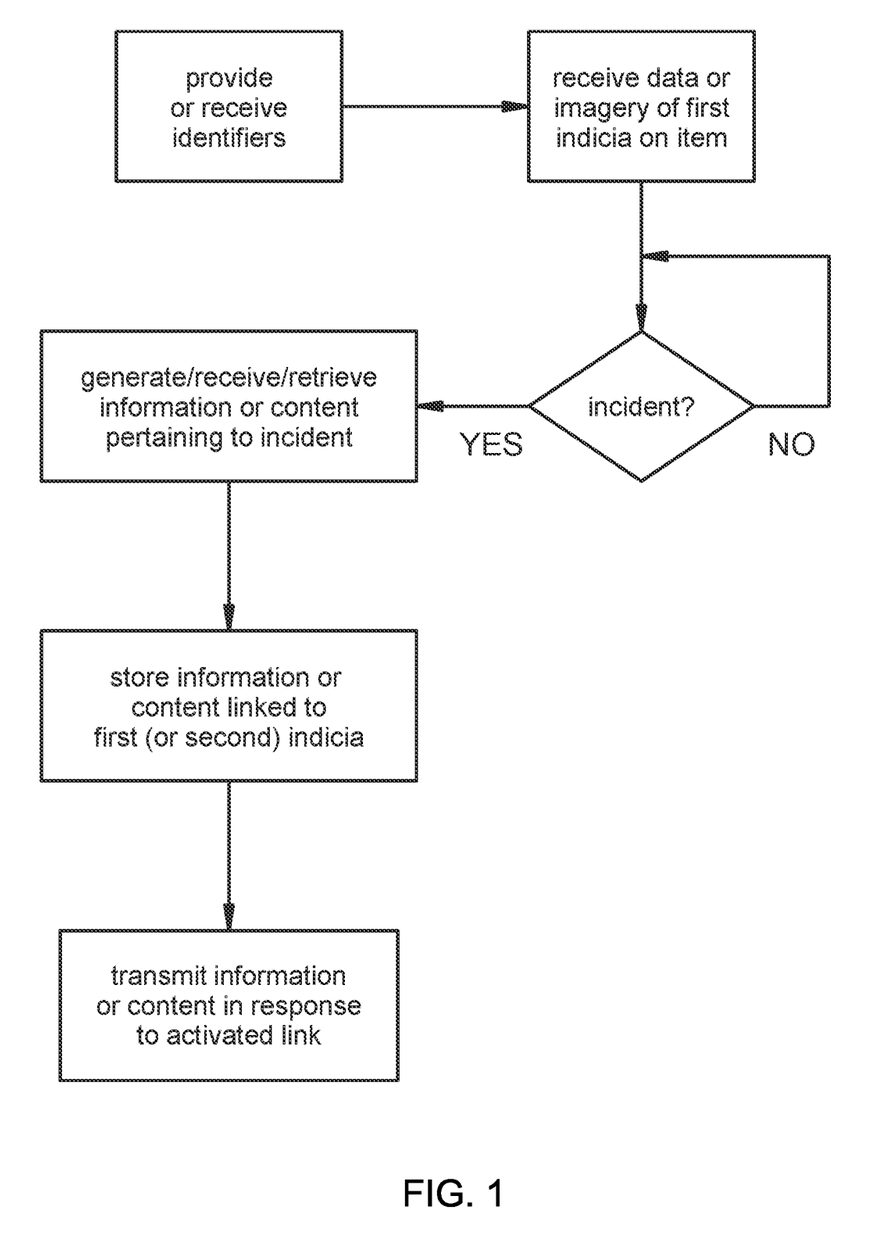
FIG. 1 is a flow diagram illustrating an example inventive method performed by an administrator of an inventive subscription system.
Figure 2:
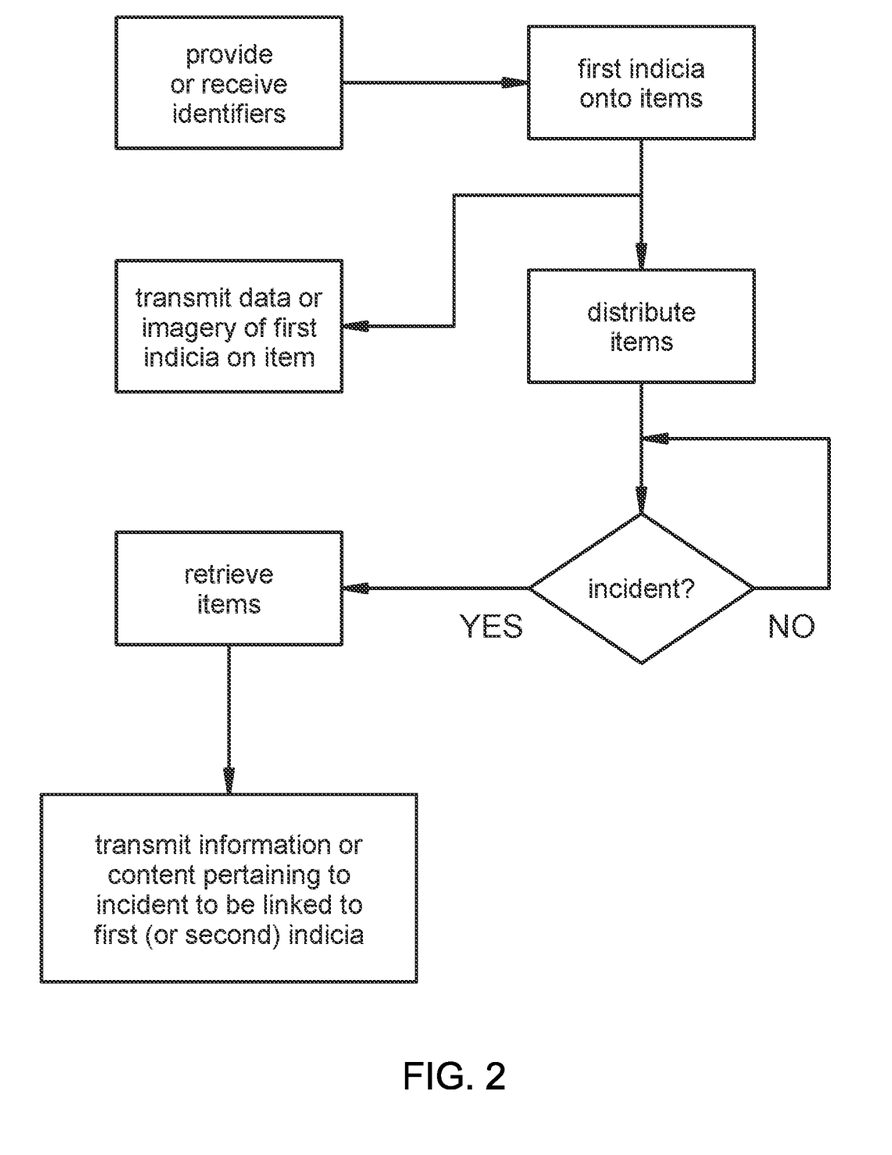
FIG. 2 is a flow diagram illustrating an example inventive method performed by a subscriber to an inventive subscription system.
Figure 3:
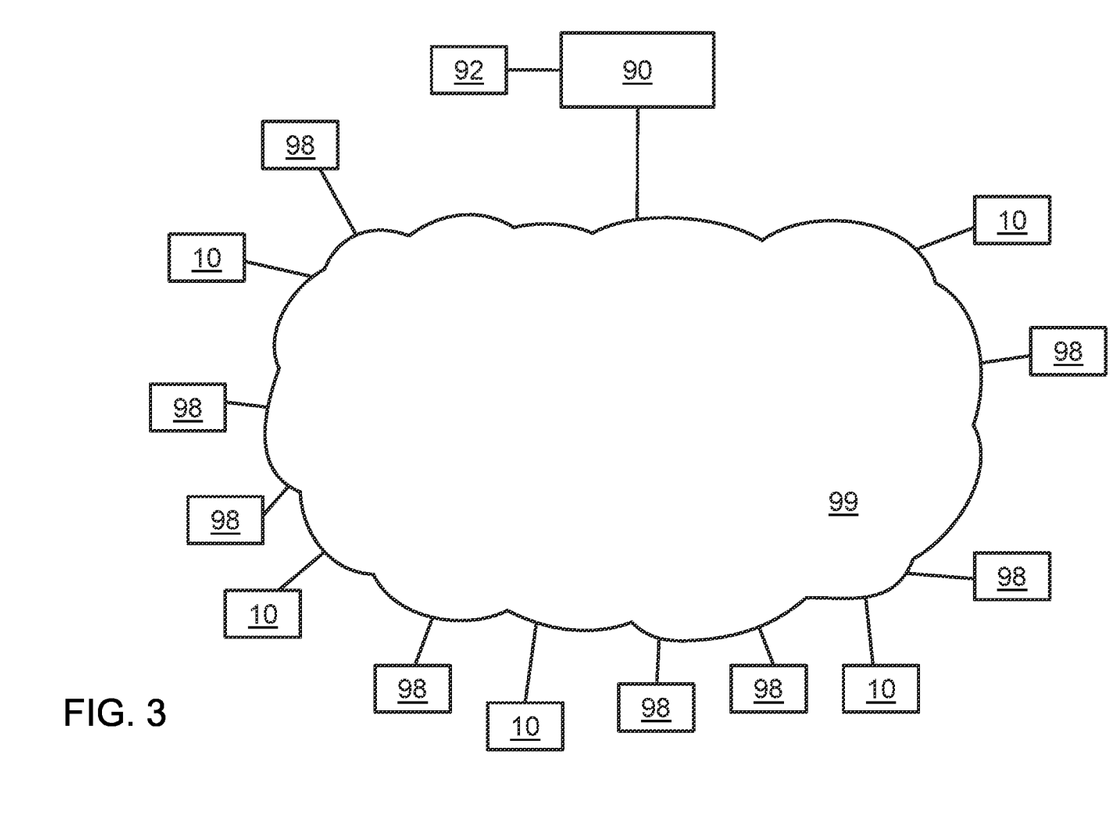
FIG. 3 illustrates schematically connections via a computer network between a subscription computer system, subscriber computer systems, and user computer systems.
Figure 4A:
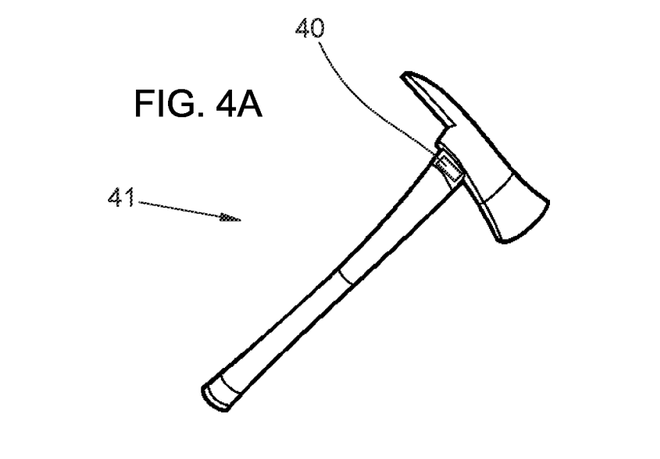
FIGS. 4A through 4D illustrate schematically several examples of items (fire axe, fire helmet, scrub shirt, and police cap, respectively) with indicia thereon of corresponding identifiers.
Figure 4B:
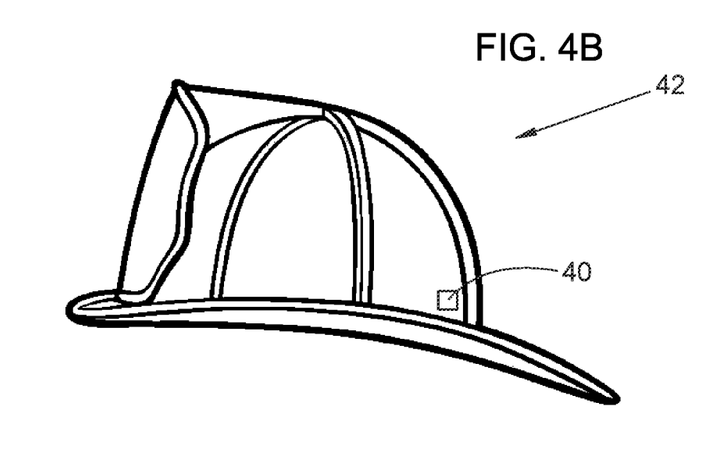
Figure 4C:
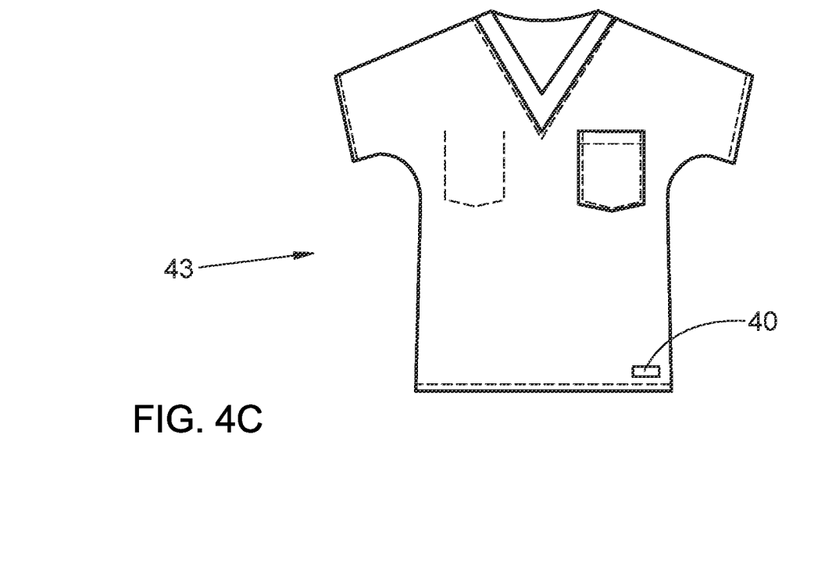
Figure 4D:
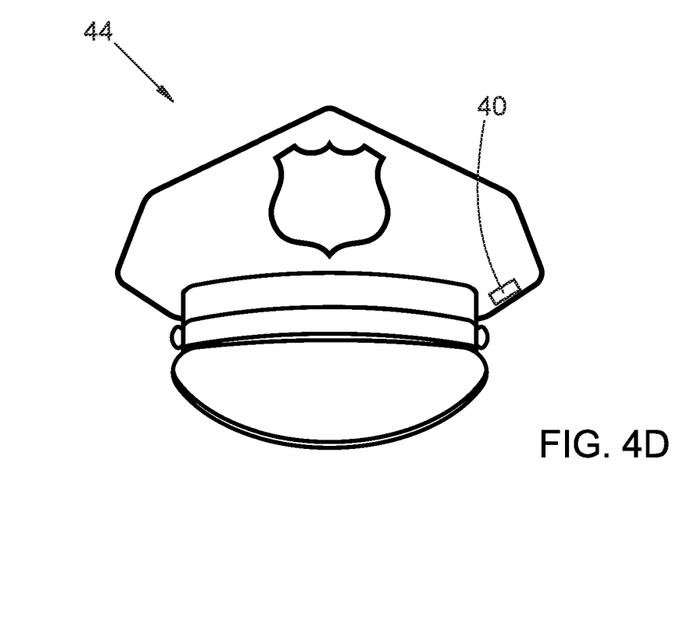

FIG. 1 is a process diagram illustrating schematically an example inventive method performed by the subscription service. FIG. 2 is a process diagram illustrating schematically an example inventive method performed by a subscriber. FIG. 3 illustrates schematically a computer system 90 employed by an administrator of the subscription service, including a network-accessible database 92 connected to a computer network 99 (e.g., the Internet); network-connected devices or computer systems 10 of multiple subscribers, and network-connected devices or computer systems 98 of multiple users, are also connected to the network 99. FIGS. 4A through 4D illustrate schematically various items worn or carried by duty personnel with corresponding first indicia 40 thereon (e.g., a fire axe 41, a fire helmet 42, a surgical scrub shirt 43, and a police cap 44). For the most part the following description includes a discussion of a single subscription service, a single subscriber, a single incident, and a single item, however, the disclosed systems and methods are applicable to one or more subscription services, one or more subscribers, one or more incidents, and one or more items.

The subscriber selects a set of items or a selected type or category. In many instances the items can include articles of clothing, tools, equipment, or other gear worn or carried by the duty personnel in the course of performing their duties. Examples can include, e.g., clothing or uniforms (such as shirts, jackets, pants, scrubs, gloves, boots, hats or caps, and so forth), protective gear (such as helmets, face shields or masks, boots, gloves, and so forth), tools or equipment (fire axes, digging implements, police or military weapons, medical gear, and so forth). A unique identifier of any suitable type or format is assigned to each item of the set (e.g., alphanumeric, symbolic, graphic, or other). The unique identifier can be generated and assigned by the subscriber and reported to the subscription service (e.g., typically by transmission over a computer network 99), or can be generated and assigned by the subscription service and transmitted to the subscriber.

First indicia of each unique identifier are integrated into the corresponding item, or affixed or applied to the item. The first indicia can be of any suitable type or format; in some examples the first indicia can include, e.g., one or more of a linear bar code, a 2D bar code, a QR code, a machine-recognizable alphanumeric code, or machine-recognizable imagery. The first indicia can be integrated, affixed, or applied in any suitable way, e.g., by being printed directly on the item, printed on a tag or label that is attached to the item, engraved or embossed on the item, woven into the item, or otherwise affixed to, applied to, or incorporated into the item. In some examples the subscriber can generate and then integrate, affix, or apply the first indicia to the items, and can transmit to the subscription service data indicative of the generated first indicia (e.g., via the computer network). In some examples the subscription service can generate the first indicia and then transmit data indicative of those generated first indicia to the subscriber (e.g., via the computer network); the subscriber can then integrate, affix, or apply the first indicia to the items. In some examples the subscription service can generate the first indicia and create corresponding tags or labels, which can then be shipped to the subscriber to be affixed or applied to the items by the subscriber. The first indicia on the items are the "pre-birth tags" referred to in the '488 priority application; the items with corresponding first indica on them are the "pre-birth items" referred to in the '488 priority application.

For each item having first indicia of a corresponding unique identifier, the subscriber generates or creates additional identification data corresponding to the first indicia on the item. The additional identification data can be of any suitable type or format. In some examples the additional identification data can include a visible, infrared, or ultraviolet image of the first indicia and a surrounding portion of the item (e.g., a digital photograph). In some examples the additional identification data can include, e.g., a visible, infrared, or ultraviolet chromatic analysis of the first indicia or a surrounding portion of the corresponding item, a 2D spatial Fourier spectrum of the first indicia or a surrounding portion of the corresponding item, or a spatial pattern analysis of the first indica or a surrounding portion of the corresponding item. The subscriber transmits the additional identification data (e.g., via the computer network 99) to the subscription service; the subscription service stores the additional identification data in a database 92 in association with the corresponding unique identifier.

The subscriber distributes the items, each with its corresponding first indicia thereon, among members of a selected group of duty personnel. The distributed items are worn or carried by those duty personnel while performing their duties. The items being worn or carried by duty personnel are the "gestating items" referred to in the '488 priority application.

After distribution of the items, in the course of the duties that are performed, one or more incidents can occur. Only some of those incidents are deemed exceptional, significant or noteworthy (ESN), i.e., selected for further processing and inclusion in a computer-searchable database 92. Examples of ESN incident types that might be included are discussed above; other incident types can be included as needed or desired. Any one or more suitable or desirable criteria (e.g., objective, subjective, qualitative, or quantitative) can be employed for deciding if a given incident is exceptional, significant, or noteworthy. In some examples, a fixed list of ESN incident types can be defined and applied as incidents occur. In some examples, a group of people (e.g., a panel, jury, or committee) can evaluate incidents for potential inclusion as ESN incidents. In some examples, a set of rules or an algorithm can be applied to determine whether a given incident warrants inclusion as an ESN incident; in some of those examples each incident can be assigned a significance score, and compared to a selected threshold score to determine inclusion. In some examples, the number of ESN incidents included can be limited to a certain number, e.g., (i) in total (e.g., for the entire system or within a certain geographic area or administrative or government district), (ii) per week, month, year, or other suitable time period, (iii) less than a defined non-unity fraction of incidents of the defined incident types (e.g., 1 in 100, 1 in 1000, and so forth), or (iv) per capita in a selected geographic area or administrative or government district. In some examples the subscription service can be the sole decider of inclusion or the sole formulator of rules, criteria, or algorithms for ESN inclusion; in some examples the subscriber can be the sole decider or sole formulator; in some examples the subscription service and the subscriber can collaborate to decide inclusion or to formulate the rules, criteria, or algorithms. In some examples the ESN inclusion decisions can be made with transparency, i.e., with any lists, rules, algorithms, criteria, or deliberations that are employed being known to the subscription service and to the subscriber, and in some instances to the duty personnel as well. In some examples one or more of any lists, rules, algorithms, criteria, or deliberations can be concealed from the subscription service by the subscriber, from the subscriber by the subscription service, or from the duty personnel by either or both of the subscription service or subscriber.

For a given ESN incident (selected for inclusion as described above), the corresponding item is retrieved from the individual among the duty personnel that was involved in that ESN incident. In some instances the involved individual might have worn or carried multiple items having corresponding identifiers and first indicia; one or more or all of those items can be retrieved as needed or desired. In some instances multiple individuals among the duty personnel might have been involved in a given ESN incident; items having corresponding identifiers and first indicia can be retrieved from one or more or all of the multiple involved individuals. The retrieved items (i.e., items having unique identifiers and first indicia that were worn or carried by involved personnel during a given ESN incident) are the "birthed items" referred to in the '488 priority application, and can be referred to as "experienced items" hereinafter.

For each selected ESN incident, information or content pertaining to that ESN incident is generated or gathered. In some examples such pertinent information or content can include one or more among: (i) a first-person account of the incident (by the involved duty personnel, by a person rescued or treated or otherwise involved in the incident, or both), (ii) one or more eye-witness accounts of the incident, (iii) one or more affidavits or other sworn statements pertaining to the incident, (iv) one or more news stories pertaining to the incident, or (v) audio, still image, or video recordings pertaining to the incident. In some examples the information or content can include the identity of the particular subscriber (e.g., hospital, fire department, police department, and so forth) that provided the item. In some examples the identities of the involved duty personnel can be included; in other examples the involved duty personnel might choose to remain anonymous. Likewise, identities of other persons involved in the incident (e.g., rescued, treated, and so forth) can be included; in other examples such persons might choose to remain anonymous. Such information or content can be generated or gathered by the subscriber, by the subscription service, or by one or more third parties. The gathered or generated information or content is retrieved by, received by, or transmitted to the subscription service, typically via the computer network 99. The subscription service stores the information or content in a network-accessible computer database 92 of its computer system 90 in association with the unique identifier of the corresponding experienced item retrieved for the corresponding ESN incident.

For each retrieved item involved in an ESN incident (i.e., each experienced item involved in that ESN event), a software link of any suitable type or format (e.g., a hyperlink) is arranged that, when activated, provides access to the information or content pertaining to that ESN incident that is stored in the network-associated database 92. In some examples, the software link can be arranged to be activated by using a network-connected device 98 to scan or machine-read the first indicia on the corresponding item (e.g., using a mobile device with a camera). The first indicia encode or indicate the unique identifier of the corresponding experienced item, and the unique identifier is associated with the information or content stored in the network accessible database 92 that pertains to the ESN incident in which the experienced item was involved.

In some examples, after a given item is involved in an ESN incident and then retrieved, second indicia can be integrated into or affixed or applied to that experienced item. The second indicia are the "prompter tags" referred to in the '488 priority application. The second indicia can encode or indicate the unique identifier of the experienced item, can encode an identifier or otherwise indicate the ESN incident in which the experienced item was involved, or both. The second indicia can be of any suitable type or arrangement (including any of those described above for the first indicia), and can be generated, created, transmitted, received, retrieved, integrated, affixed, or applied in any of the ways described above for the first indicia. Additional identification information related to the second indicia (e.g., imagery, chromatic analysis, 2D spatial Fourier transform, or spatial pattern analysis) can be stored in the network-connected database in a manner similar to that described above for the first indicia. In some examples, the software link can be arranged to be activated by using a network-connected device 98 to scan or machine-read the second indicia on the corresponding experienced item (e.g., using a mobile device with a camera), as described above for the first indicia.

The first or second indicia on experienced items involved in ESN incidents can serve one or more purposes. In some examples, activating the software link can enable one to access the information or content pertaining to the ESN incident in which the item was involved. Such access can be provided for educational or informational purposes (e.g., as part of an exhibit or memorial), as part of a publicity, promotional, awareness, or recruitment campaign, or as an aid to personal introductions, conversations, or other social interactions. A person using, e.g., a network-connected mobile device 98 with a camera can acquire and image of the first indicia on the item (or the second indicia, if present), which would activate the software link to the information or content in the network-accessible database 92 maintained by the subscription service. In response to the activated link, some or all of the information or content related to the incident can be transmitted via the computer network 99 to the mobile device 98, or to another designated device 98, for being viewed, heard, or read by one or more persons.

In some examples the first or second indicia can be employed for authenticating a given item as being the same experienced item that was involved in the ESN incident. The uniqueness of the item identifier is a first step toward achieving that purpose. Each subsequent scan or reading of the first or second indicia that indicates the unique identifier can be interpreted as at least initial confirmation of the authenticity of the item. In examples in which additional identification data is generated and stored (e.g., imagery of the indicia that includes a portion of the experienced item, chromatic analysis, 2D spatial Fourier analysis, or spatial pattern analysis), even more reliable authentication can be provided, because typically that additional data cannot readily be copied and reproduced on another, counterfeit item.

Initial authentication (e.g., immediately after the incident, before or shortly after retrieval of the item from personnel involved in the incident) can in some instances be established by, e.g., eyewitness accounts or sworn statements by the involved personnel or by other witnesses. If still or video imagery of the incident exists, in some instances the experienced item and its first indicia can be identified in the imagery. Once initially authenticated and retrieved, the first indica and any additional identification data can be used to generate and maintain a chain of possession or provenance of the item. If second indicia are placed on the item, those second indicia can be similarly employed.

The subscription service provides the authentication as long as the subscriber, or any subsequent owner, maintains an active subscription for that item, e.g., by paying a subscription fee or by regularly updating information related to the item (e.g., location, ownership, and so forth). In some examples, upon any change of ownership, or at any other time authentication is desired, the first indicia (or second indicia, if present) can be imaged (e.g., by a network-connected mobile device with a camera) and that acquired image can be transmitted (e.g., via the computer network) to the subscription service. The subscription service in turn can use additional identification data stored in the database in association with the unique identifier to confirm or deny that the imaged indicia (and the purported experienced item) are authentic. For example, the acquired image can be compared to the image stored in the database, or the acquired image can be analyzed and compared to one or more analyses (e.g., chromatic, 2D Fourier, or spatial pattern) stored in the database. A sufficiently close match results in a positive authentication as the experienced item. A sufficiently large mismatch results in the authentication attempt being rejected. The acquired image or any analyses thereof can then be discarded in some examples; in other examples the acquired image or any analyses thereof can be retained in the database, in addition to the additional identification data already stored, or replacing that additional identification data. Inclusion of a portion of the item surrounding the first or second indicia can enable detection of any unauthorized transfer of those indicia from the authentic item to a different, counterfeit item. Note that the systems and methods disclosed herein can be adapted for authenticating, e.g., so-called "designer" articles (clothing, jewelry, accessories, and such) to inhibit counterfeiting.

In some examples owner information for each item can be included in the database, and can be updated with each subsequent transfer of ownership. The authentication enabled by the first or second indicia can be employed to facilitate transfers of ownership of the corresponding item (e.g., by sale or donation), or to discourage such transfers. A would-be acquirer (e.g., a purchaser or donee) of the item can do so with confidence in the item's authenticity. Maintaining an active subscription can enable that acquirer to subsequently transfer ownership to another acquirer with a similar level of confidence in the item's authenticity. Alternatively, in some examples it can be stipulated that the subscription, and also any authentication enabled by that subscription, would end with any transfer of ownership, effectively restricting subsequent sales or transfers of the item.

In some examples the computer system that includes the database can be employed to facilitate communication between a person involved in the incident (e.g., the involved duty personnel that wore or carried the item) and a subsequent owner or acquirer of the item. Such communication can be facilitated, e.g., by providing an electronic communications link between the wearer/carrier and the acquirer, such as by email, text messaging, or voice communications. In some examples the wearer/carrier, the acquirer, or both might choose to remain anonymous despite participating in such communications.

The systems and methods disclosed herein can be implemented as or with general or special purpose computers or servers or other programmable hardware devices programmed through software, or as hardware or equipment "programmed" through hard wiring, or a combination of the two. A "computer" or "server" can comprise a single machine or can comprise multiple interacting machines (located at a single location or at multiple remote locations). Computer programs or other software code, if used, can be implemented in tangible, non-transient, temporary or permanent storage or replaceable media, such as by including programming in microcode, machine code, network-based or web-based or distributed software modules that operate together, RAM, ROM, CD-ROM, CD-R, CD-R/W, DVD-ROM, DVD±R, DVD±R/W, hard drives, thumb drives, flash memory, optical media, magnetic media, semiconductor media, or any future computer-readable storage alternatives. Electronic indicia of a dataset can be read from, received from, or stored on any of the tangible, non-transitory computer-readable media mentioned herein.

In addition to the preceding, the following example embodiments fall within the scope of the present disclosure or appended claims. Any given Examples that refers to some or all preceding Examples shall be understood to refer to only those preceding Examples with which the given Example is not inconsistent, and to exclude those preceding Examples with which the given Example is inconsistent.

Example 1. A computer-implemented method comprising: (a) for each item of a plurality of items of a selected type or category, providing or receiving at a computer system a corresponding unique identifier; (b) for each item of the plurality of items, receiving at the computer system data or imagery of corresponding first indicia of the corresponding unique identifier being integrated into the item or affixed or applied to the item; (c) for each of a plurality of incidents, after occurrence of that incident generating, retrieving, or receiving at the computer system corresponding information or content pertaining to that incident, said incidents of the plurality being of corresponding types among a set of defined incident types and involving corresponding members of a selected group of duty personnel while wearing or carrying corresponding items of the plurality while performing duties after the corresponding data or imagery were received in part (b); and (d) for each incident of the plurality of incidents, storing the corresponding information or content in a network-accessible database of the computer system in association with the corresponding unique identifier of the corresponding item, and arranging a corresponding software or network link to the corresponding information or content stored in the database to be activated by using a network-connected device to scan or machine-read the first indicia of the corresponding unique identifier or second indicia of the corresponding unique identifier subsequently affixed or applied to the corresponding item.

Example 2. The method of Example 1 further comprising generating at the computer system the corresponding unique identifiers and first indicia, and sending or transmitting from the computer system the corresponding unique identifiers and first indicia to one or more corresponding holders of the items of the plurality of items.

Example 3. The method of any one of Examples 1 or 2 further comprising, for each incident of the plurality of incidents, receiving at the computer system data or imagery of second indicia of the corresponding unique identifier of the corresponding item worn or carried by duty personnel involved in that incident.

Example 4. The method of Example 3 further comprising generating at the computer system the corresponding second indicia, and sending or transmitting from the computer system the corresponding second indicia to a holder of the item worn or carried by duty personnel involved in the incident.

Example 5. The method of any one of Examples 1 through 4 wherein the first or second indicia includes one or more of a linear bar code, a 2D bar code, a QR code, a machine-recognizable alphanumeric code, or machine-recognizable imagery.

Example 6. The method of any one of Examples 1 through 5 wherein the corresponding first or second indicia are to be (i) printed directly on the item, (ii) printed on a tag or label that is to be attached to the item, (iii) engraved or embossed on the item, or (iv) woven into the item.

Example 7. The method of Example 6 further comprising printing on corresponding tags or labels the corresponding first or second indicia, and sending the corresponding tags or labels to one or more corresponding holders of the items of the plurality of items.

Example 8. The method of any one of Examples 6 or 7 further comprising generating, retrieving, or receiving a the computer system additional identification data corresponding to the first or second indicia of one or more of the unique identifiers and storing the additional identification data in the database of the computer system in association with the corresponding unique identifier, the additional identification data including one or more among: (i) a visible, infrared, or ultraviolet image of the first or second indicia and a surrounding portion of the corresponding item, (ii) a visible, infrared, or ultraviolet chromatic analysis of the first or second indicia or a surrounding portion of the corresponding item, (iii) a 2D spatial Fourier spectrum of the first or second indicia or a surrounding portion of the corresponding item, (iv) a spatial pattern analysis of the first or second indica or a surrounding portion of the corresponding item.

Example 9. The method of Example 8 wherein the additional identification data includes data indicative of the surrounding portion of the item so as to enable detection of any transfer of the first or second indicia of the unique identifier from the corresponding item to a different item.

Example 10. The method of any one of Examples 8 or 9 further comprising, for each change of ownership of one of the items corresponding to one of the incidents, (i) generating, retrieving, or receiving at the computer system updated additional identification information corresponding to the first or second indicia of that item, and (ii) using the computer system, comparing the updated additional identification data with earlier additional identification data of that item to verify that the item was involved in the corresponding incident.

Example 11. The method of Example 10 wherein the database includes, for one or more incidents among the plurality, a corresponding indicator of one or more restrictions on changes of ownership of the corresponding item.

Example 12. The method of any one of Examples 1 through 11 wherein the selected group of duty personnel includes one or more among: (i) one or more police officers or other law enforcement personnel, (ii) one or more firefighters, (iii) one or more emergency medical first responders, (iv) one or more medical or veterinary personnel, (v) one or more military personnel, or (vi) one or more park rangers or other park or forest service personnel.

Example 13. The method of any one of Examples 1 through 12 wherein the plurality of items of the selected type or category includes one or more among: (i) one or more items of clothing, (ii) one or more uniforms, (iii) one or more items of protective gear, or (iv) one or more tools or pieces of equipment.

Example 14. The method of any one of Examples 1 through 13 wherein the defined incident types include one or more among: (i) a fire rescue, (ii) an entrapped rescue, (iii) a search-and-rescue, (iv) a hostage rescue, (v) a thwarted crime, (vi) a medical procedure, (vii) a military operation, or (viii) an animal rescue.

Example 15. The method of any one of Examples 1 through 14 wherein one or more incidents among the plurality of incidents is a corresponding single, isolated incident.

Example 16. The method of any one of Examples 1 through 15 wherein one or more incidents among the plurality of incidents is a corresponding cumulative achievement of one or more members of one of the selected groups of duty personnel.

Example 17. The method of any one of Examples 1 through 16 wherein the incidents of the plurality are selected from among a larger set of incidents of the defined incident types based on one or more selection criteria.

Example 18. The method of Example 17 further comprising assigning to each one of multiple incidents a corresponding significance score, and including in the plurality of incidents only those incidents having a significance score exceeding a selected threshold score.

Example 19. The method of any one of Examples 17 or 18 wherein incidents of the plurality are selected only within one or more selected numerical limits.

Example 20. The method of any one of Examples 17 through 19 wherein the one or more selection criteria are concealed from the duty personnel or from supervisors thereof or from distributors of the items of the plurality to the duty personnel.

Example 21. The method of any one of Examples 17 through 19 further comprising selecting incidents for inclusion in the plurality of incidents in collaboration with supervisors of the duty personnel or with distributors of the items of the plurality to the duty personnel.

Example 22. The method of any one of Examples 1 through 21 wherein the information or content pertaining to each of the plurality of incidents can include one or more among: (i) a first-person account of the incident, (ii) one or more eye-witness accounts of the incident, (iii) one or more affidavits or other sworn statements pertaining to the incident, (iv) one or more news stories pertaining to the incident, or (v) audio, still image, or video recordings pertaining to the incident.

Example 23. The method of any one of Examples 1 through 22 further comprising, for one or more incidents of the plurality, establishing an electronic communications link between a subsequent owner of the corresponding item and the wearer or carrier of that item during that incident.

Example 24. The method of any one of Examples 1 through 23 further comprising, in response to activation of the corresponding software link by a remote, network-connected device, transmitting some or all of the stored information or content pertaining to the corresponding incident to the remote, network-connected device.

Example 25. A method comprising: (a) for each item of a plurality of items of a selected type or category, providing to or receiving from a computer system a corresponding unique identifier; (b) for each item of the plurality of items, integrating into the item or affixing or applying to the item first indicia of the corresponding unique identifier; (c) after part (b), for each item of the plurality of items, transmitting to the computer system, for storage in a network-accessible database of the computer system in association with the corresponding unique identifier, data or imagery of corresponding first indicia of the corresponding unique identifier being integrated into the item or affixed or applied to the item; (d) after part (b), providing one or more or all of the items of the plurality for distribution among members of a selected group of duty personnel, the distributed items to be worn or carried by those duty personnel while performing duties; (e) after part (d), for each of a plurality of incidents, said incidents being of a corresponding type among a set of defined incident types, after occurrence of that incident retrieving the corresponding item from a corresponding member of the duty personnel that was involved in that incident while wearing or carrying the corresponding item; and (f) for each incident of the plurality of incidents, transmitting to the computer system corresponding information or content pertaining to that incident for storage in the network-accessible database in association with the corresponding unique identifier, (g) the first indicia of the corresponding unique identifier, or second indicia of the corresponding unique identifier subsequently affixed or applied to the corresponding item, being arranged so as to activate a corresponding software or network link to the corresponding information or content stored in the database upon scanning or machine-reading of the corresponding first or second indicia on the corresponding item using a network-connected device.

Example 26. The method of Example 25 further comprising generating the corresponding unique identifiers and first indicia, and transmitting the corresponding unique identifiers and first indicia to the computer system.

Example 27. The method of any one of Examples 25 or 26 further comprising, for each incident of the plurality of incidents, transmitting to the computer system data or imagery of second indicia of the corresponding unique identifier of the corresponding item worn or carried by duty personnel involved in that incident.

Example 28. The method of Example 27 further comprising generating the corresponding second indicia, and sending or transmitting the corresponding second indicia to the computer system.

Example 29. The method of any one of Examples 25 through 28 wherein the first or second indicia includes one or more of a linear bar code, a 2D bar code, a QR code, a machine-recognizable alphanumeric code, or machine-recognizable imagery.

Example 30. The method of any one of Examples 25 through 29 further comprising: (i) printing the corresponding first or second indicia directly on the item, (ii) attaching a tag or label to the item, the tag or label having the corresponding first or second indicia printed thereon, (iii) engraved or embossed the corresponding first or second indicia on the item, or (iv) weaving the corresponding first or second indicia into the item.

Example 31. The method of Example 30 further comprising transmitting to the computer system, for storage in the network-accessible database in association with the corresponding unique identifier, additional identification data corresponding to the first or second indicia of one or more of the unique identifiers, the additional identification data including one or more among: (i) a visible, infrared, or ultraviolet image of the first or second indicia and a surrounding portion of the corresponding item, (ii) a visible, infrared, or ultraviolet chromatic analysis of the first or second indicia or a surrounding portion of the corresponding item, (iii) a 2D spatial Fourier spectrum of the first or second indicia or a surrounding portion of the corresponding item, (iv) a spatial pattern analysis of the first or second indica or a surrounding portion of the corresponding item.

Example 32. The method of Example 31 wherein the additional identification data includes data indicative of the surrounding portion of the item so as to enable detection of any transfer of the first or second indicia of the unique identifier from the corresponding item to a different item.

Example 33. The method of any one of Examples 25 through 32 wherein the selected group of duty personnel includes one or more among: (i) one or more police officers or other law enforcement personnel, (ii) one or more firefighters, (iii) one or more emergency medical first responders, (iv) one or more medical or veterinary personnel, (v) one or more military personnel, or (vi) one or more park rangers or other park or forest service personnel.

Example 34. The method of any one of Examples 25 through 33 wherein the plurality of items of the selected type or category includes one or more among: (i) one or more items of clothing, (ii) one or more uniforms, (iii) one or more items of protective gear, or (iv) one or more tools or pieces of equipment.

Example 35. The method of any one of Examples 25 through 34 wherein the defined incident types include one or more among: (i) a fire rescue, (ii) an entrapped rescue, (iii) a search-and-rescue, (iv) a hostage rescue, (v) a thwarted crime, (vi) a medical procedure, (vii) a military operation, or (viii) an animal rescue.

Example 36. The method of any one of Examples 25 through 35 wherein one or more incidents among the plurality of incidents is a corresponding single, isolated incident.

Example 37. The method of any one of Examples 25 through 36 wherein one or more incidents among the plurality of incidents is a corresponding cumulative achievement of one or more members of one of the selected groups of duty personnel.

Example 38. The method of any one of Examples 25 through 37 wherein the incidents of the plurality are selected from among a larger set of incidents of the defined incident types based on one or more selection criteria.

Example 39. The method of Example 38 further comprising assigning to each one of multiple incidents a corresponding significance score, and including in the plurality of incidents only those incidents having a significance score exceeding a selected threshold score.

Example 40. The method of any one of Examples 38 or 39 wherein incidents of the plurality are selected only within one or more selected numerical limits.

Example 41. The method of any one of Examples 38 through 40 wherein the one or more selection criteria are concealed from the duty personnel or from supervisors thereof or from distributors of the items of the plurality to the duty personnel.

Example 42. The method of any one of Examples 38 through 40 further comprising selecting incidents for inclusion in the plurality of incidents in collaboration with supervisors of the duty personnel or with distributors of the items of the plurality to the duty personnel.

Example 43. The method of any one of Examples 25 through 42 wherein the information or content pertaining to each of the plurality of incidents can include one or more among: (i) a first-person account of the incident, (ii) one or more eye-witness accounts of the incident, (iii) one or more affidavits or other sworn statements pertaining to the incident, (iv) one or more news stories pertaining to the incident, or (v) audio, still image, or video recordings pertaining to the incident.

This disclosure is illustrative and not limiting. Further modifications will be apparent to one skilled in the art in light of this disclosure and are intended to fall within the scope of the present disclosure or appended claims. It is intended that equivalents of the disclosed example embodiments and methods, or modifications thereof, shall fall within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words "comprising," "including," "having," and variants thereof, wherever they appear, shall be construed as open ended terminology, with the same meaning as if a phrase such as "at least" were appended after each instance thereof, unless explicitly stated otherwise. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each. "Two or more", "three or more", "four or more", and so on would be analogously interpreted.

For purposes of the present disclosure or appended claims, when a numerical quantity is recited (with or without terms such as "about," "about equal to," "substantially equal to," "greater than about," "less than about," and so forth), standard conventions pertaining to measurement precision, rounding error, and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A computer-implemented method comprising:
   (a) for each item of a plurality of items of a selected type or category, providing or receiving at a computer system a corresponding unique identifier;
   (b) for each item of the plurality of items, receiving at the computer system data or imagery of corresponding first indicia of the corresponding unique identifier being integrated into the item or affixed or applied to the item;
   (c) for each of a plurality of incidents, after occurrence of that incident generating, retrieving, or receiving at the computer system corresponding information or content pertaining to that incident, said incidents of the plurality being of corresponding types among a set of defined incident types and involving corresponding members of a selected group of duty personnel while wearing or carrying corresponding items of the plurality while performing duties after the corresponding data or imagery were received in part (b); and
   (d) for each incident of the plurality of incidents, storing the corresponding information or content in a network-accessible database of the computer system in association with the corresponding unique identifier of the corresponding item, and arranging a corresponding software or network link to the corresponding information or content stored in the database to be activated by using a network-connected device to scan or machine-read the first indicia of the corresponding unique identifier or second indicia of the corresponding unique identifier subsequently affixed or applied to the corresponding item.

2. The method of claim 1 further comprising generating at the computer system the corresponding unique identifiers and first indicia, and sending or transmitting from the computer system the corresponding unique identifiers and first indicia to one or more corresponding holders of the items of the plurality of items.

3. The method of claim 1 further comprising, for each incident of the plurality of incidents, receiving at the computer system data or imagery of second indicia of the corresponding unique identifier of the corresponding item worn or carried by duty personnel involved in that incident.

4. The method of claim 3 further comprising generating at the computer system the corresponding second indicia, and sending or transmitting from the computer system the corresponding second indicia to a holder of the item worn or carried by duty personnel involved in the incident.

5. The method of claim 1 wherein the first or second indicia includes one or more of a linear bar code, a 2D bar code, a QR code, a machine-recognizable alphanumeric code, or machine-recognizable imagery.

6. The method of claim 1 wherein the corresponding first or second indicia are to be (i) printed directly on the item, (ii) printed on a tag or label that is to be attached to the item, (iii) engraved or embossed on the item, or (iv) woven into the item.

7. The method of claim 6 further comprising printing on corresponding tags or labels the corresponding first or second indicia, and sending the corresponding tags or labels to one or more corresponding holders of the items of the plurality of items.

8. The method of claim 6 further comprising generating, retrieving, or receiving at the computer system additional identification data corresponding to the first or second indicia of one or more of the unique identifiers and storing the additional identification data in the database of the computer system in association with the corresponding unique identifier, the additional identification data including one or more among: (i) a visible, infrared, or ultraviolet image of the first or second indicia and a surrounding portion of the corresponding item, (ii) a visible, infrared, or ultraviolet chromatic analysis of the first or second indicia or a surrounding portion of the corresponding item, (iii) a 2D spatial Fourier spectrum of the first or second indicia or a surrounding portion of the corresponding item, (iv) a spatial pattern analysis of the first or second indica or a surrounding portion of the corresponding item.

9. The method of claim 8 wherein the additional identification data includes data indicative of the surrounding portion of the item so as to enable detection of any transfer of the first or second indicia of the unique identifier from the corresponding item to a different item.

10. The method of claim 8 further comprising, for each change of ownership of one of the items corresponding to one of the incidents, (i) generating, retrieving, or receiving at the computer system updated additional identification information corresponding to the first or second indicia of that item, and (ii) using the computer system, comparing the updated additional identification data with earlier additional identification data of that item to verify that the item was involved in the corresponding incident.

11. The method of claim 10 wherein the database includes, for one or more incidents among the plurality, a corresponding indicator of one or more restrictions on changes of ownership of the corresponding item.

12. The method of claim 1 wherein the selected group of duty personnel includes one or more among: (i) one or more police officers or other law enforcement personnel, (ii) one or more firefighters, (iii) one or more emergency medical first responders, (iv) one or more medical or veterinary personnel, (v) one or more military personnel, or (vi) one or more park rangers or other park or forest service personnel.

13. The method of claim 1 wherein the plurality of items of the selected type or category includes one or more among: (i) one or more items of clothing, (ii) one or more uniforms, (iii) one or more items of protective gear, or (iv) one or more tools or pieces of equipment.

14. The method of claim 1 wherein the defined incident types include one or more among: (i) a fire rescue, (ii) an entrapped rescue, (iii) a search-and-rescue, (iv) a hostage rescue, (v) a thwarted crime, (vi) a medical procedure, (vii) a military operation, or (viii) an animal rescue.

15. The method of claim 1 wherein at least one incident among the plurality of incidents is a corresponding single, isolated incident.

16. The method of claim 1 wherein at least one incident among the plurality of incidents is a corresponding cumulative achievement of one or more members of one of the selected groups of duty personnel.

17. The method of claim 1 wherein the incidents of the plurality are selected from among a larger set of incidents of the defined incident types based on one or more selection criteria.

18. The method of claim 17 further comprising assigning to each one of multiple incidents a corresponding significance score, and including in the plurality of incidents only those incidents having a significance score exceeding a selected threshold score.

19. The method of claim 17 wherein incidents of the plurality are selected only within one or more selected numerical limits.

20. The method of claim 17 wherein the one or more selection criteria are concealed from the duty personnel or from supervisors thereof or from distributors of the items of the plurality to the duty personnel.

21. The method of claim 17 further comprising selecting incidents for inclusion in the plurality of incidents in collaboration with supervisors of the duty personnel or with distributors of the items of the plurality to the duty personnel.

22. The method of claim 1 wherein the information or content pertaining to each of the plurality of incidents can include one or more among: (i) one or more first-person accounts of the incident, (ii) one or more eye-witness accounts of the incident, (iii) one or more affidavits or other sworn statements pertaining to the incident, (iv) one or more news stories pertaining to the incident, or (v) one or more audio, still image, or video recordings pertaining to the incident.

23. The method of claim 1 further comprising, for one or more incidents of the plurality, establishing an electronic communications link between a subsequent owner of the corresponding item and the wearer or carrier of that item during that incident.

24. The method of claim 1 further comprising, in response to activation of the corresponding software link by a remote, network-connected device, transmitting some or all of the stored information or content pertaining to the corresponding incident to the remote, network-connected device.

25. A method comprising:
(a) for each item of a plurality of items of a selected type or category, providing to or receiving from a computer system a corresponding unique identifier;
(b) for each item of the plurality of items, integrating into the item or affixing or applying to the item first indicia of the corresponding unique identifier;
(c) after part (b), for each item of the plurality of items, transmitting to the computer system, for storage in a network-accessible database of the computer system in association with the corresponding unique identifier, data or imagery of corresponding first indicia of the corresponding unique identifier being integrated into the item or affixed or applied to the item;
(d) after part (b), providing one or more or all of the items of the plurality for distribution among members of a selected group of duty personnel, the distributed items to be worn or carried by those duty personnel while performing duties;
(e) after part (d), for each of a plurality of incidents, said incidents being of a corresponding type among a set of defined incident types, after occurrence of that incident retrieving the corresponding item from a corresponding member of the duty personnel that was involved in that incident while wearing or carrying the corresponding item; and
(f) for each incident of the plurality of incidents, transmitting to the computer system corresponding information or content pertaining to that incident for storage in the network-accessible database in association with the corresponding unique identifier,
(g) the first indicia of the corresponding unique identifier, or second indicia of the corresponding unique identifier subsequently affixed or applied to the corresponding item, being arranged so as to activate a corresponding software or network link to the corresponding information or content stored in the database upon scanning or machine-reading of the corresponding first or second indicia on the corresponding item using a network-connected device.

26. The method of claim 25 further comprising generating the corresponding unique identifiers and first indicia, and transmitting the corresponding unique identifiers and first indicia to the computer system.

27. The method of claim 25 further comprising, for each incident of the plurality of incidents, transmitting to the computer system data or imagery of second indicia of the corresponding unique identifier of the corresponding item worn or carried by duty personnel involved in that incident.

28. The method of claim 27 further comprising generating the corresponding second indicia, and sending or transmitting the corresponding second indicia to the computer system.

29. The method of claim 25 wherein the first or second indicia includes one or more of a linear bar code, a 2D bar code, a QR code, a machine-recognizable alphanumeric code, or machine-recognizable imagery.

30. The method of claim 25 further comprising: (i) printing the corresponding first or second indicia directly on the item, (ii) attaching a tag or label to the item, the tag or label having the corresponding first or second indicia printed thereon, (iii) engraving or embossing the corresponding first or second indicia on the item, or (iv) weaving the corresponding first or second indicia into the item.

31. The method of claim 30 further comprising transmitting to the computer system, for storage in the network-accessible database in association with the corresponding unique identifier, additional identification data corresponding to the first or second indicia of one or more of the unique identifiers, the additional identification data including one or more among: (i) a visible, infrared, or ultraviolet image of the first or second indicia and a surrounding portion of the corresponding item, (ii) a visible, infrared, or ultraviolet chromatic analysis of the first or second indicia or a surrounding portion of the corresponding item, (iii) a 2D spatial Fourier spectrum of the first or second indicia or a surrounding portion of the corresponding item, (iv) a spatial pattern analysis of the first or second indica or a surrounding portion of the corresponding item.

32. The method of claim 31 wherein the additional identification data includes data indicative of the surrounding portion of the item so as to enable detection of any transfer of the first or second indicia of the unique identifier from the corresponding item to a different item.

33. The method of claim 25 wherein the selected group of duty personnel includes one or more among: (i) one or more police officers or other law enforcement personnel, (ii) one or more firefighters, (iii) one or more emergency medical first responders, (iv) one or more medical or veterinary personnel, (v) one or more military personnel, or (vi) one or more park rangers or other park or forest service personnel.

34. The method of claim 25 wherein the plurality of items of the selected type or category includes one or more among: (i) one or more items of clothing, (ii) one or more uniforms, (iii) one or more items of protective gear, or (iv) one or more tools or pieces of equipment.

35. The method of claim 25 wherein the defined incident types include one or more among: (i) a fire rescue, (ii) an entrapped rescue, (iii) a search-and-rescue, (iv) a hostage rescue, (v) a thwarted crime, (vi) a medical procedure, (vii) a military operation, or (viii) an animal rescue.

36. The method of claim 25 wherein at least one incident among the plurality of incidents is a corresponding single, isolated incident.

37. The method of claim 25 wherein at least one incident among the plurality of incidents is a corresponding cumulative achievement of one or more members of one of the selected groups of duty personnel.

38. The method of claim 25 wherein the incidents of the plurality are selected from among a larger set of incidents of the defined incident types based on one or more selection criteria.

39. The method of claim 38 further comprising assigning to each one of multiple incidents a corresponding significance score, and including in the plurality of incidents only those incidents having a significance score exceeding a selected threshold score.

40. The method of claim 38 wherein incidents of the plurality are selected only within one or more selected numerical limits.

41. The method of claim 38 wherein the one or more selection criteria are concealed from the duty personnel or from supervisors thereof or from distributors of the items of the plurality to the duty personnel.

42. The method of claim 38 further comprising selecting incidents for inclusion in the plurality of incidents in collaboration with supervisors of the duty personnel or with distributors of the items of the plurality to the duty personnel.

43. The method of claim 25 wherein the information or content pertaining to each of the plurality of incidents can include one or more among: (i) one or more first-person accounts of the incident, (ii) one or more eye-witness accounts of the incident, (iii) one or more affidavits or other sworn statements pertaining to the incident, (iv) one or more news stories pertaining to the incident, or (v) one or more audio, still image, or video recordings pertaining to the incident.

\* \* \* \* \*